United States Patent [19]
Quaeck

[11] Patent Number: 5,383,548
[45] Date of Patent: Jan. 24, 1995

[54] RECIPROCATING FLOOR CONVEYOR

[76] Inventor: Manfred W. Quaeck, 1515-210th Ave. NE., Redmond, Wash. 98053

[21] Appl. No.: 885,231

[22] Filed: May 18, 1992

Related U.S. Application Data

[63] Continuation-in-part of Ser. No. 874,372, Apr. 27, 1992, abandoned.

[51] Int. Cl.$^6$ .............................................. B65G 25/04
[52] U.S. Cl. .................. 198/750; 414/525.9; 414/573; 414/355
[58] Field of Search ................. 414/525.1, 373, 525.9, 414/355; 91/530, 508, 519, 117 OR; 198/750, 773, 774.1, 775

[56] References Cited

U.S. PATENT DOCUMENTS

| | | |
|---|---|---|
| Re. 33,196 | 4/1990 | Foster . |
| 3,534,875 | 10/1970 | Hallstrom . |
| 4,143,760 | 3/1979 | Hallstrom . |
| 4,144,963 | 3/1979 | Hallstrom . |
| 4,157,761 | 6/1979 | Debor . |
| 4,184,587 | 1/1980 | Hallstrom . |
| 4,492,303 | 1/1985 | Foster . |
| 4,580,678 | 4/1986 | Foster . |
| 4,611,708 | 9/1986 | Foster . |
| 4,679,686 | 7/1987 | Foster . |
| 4,691,819 | 9/1987 | Hallstrom . |
| 4,727,978 | 3/1988 | Hallstrom . |
| 4,749,075 | 6/1988 | Foster . |
| 4,785,929 | 11/1988 | Foster . |
| 4,793,468 | 12/1988 | Hamilton et al. ............ 414/525.9 X |
| 4,821,868 | 4/1989 | Foster ........................ 414/525.9 X |
| 4,856,645 | 8/1989 | Hallstrom . |
| 4,940,132 | 7/1990 | Foster . |
| 4,962,848 | 10/1990 | Foster ........................ 414/525.1 X |
| 5,064,052 | 11/1991 | Foster . |
| 5,088,595 | 2/1992 | Hallstrom . |
| 5,096,356 | 3/1992 | Foster . |
| 5,103,866 | 4/1992 | Foster . |
| 5,125,502 | 6/1992 | Foster . |
| 5,193,661 | 3/1993 | Foster ........................ 198/750 |
| 5,222,593 | 6/1993 | Quaeck ........................ 198/750 |
| 5,228,555 | 7/1993 | Hallstrom .................... 414/525.9 X |

OTHER PUBLICATIONS

Spiro Floor System Brochure, Spiro BV, Postbus 231, 7800 AE, Emmen, Holland, publication date unknown.
Lummus Module Feeder Brochure, Lummus Industries, Inc., 712 10th Ave., Columbus, Ga., 31994, publication date unknown.
Stover Equipment Brochure, Jimmy Ray Stover, Walters, Oklahoma, publication date unknown.

*Primary Examiner*—Frank E. Werner
*Attorney, Agent, or Firm*—Graybeal Jackson Haley & Johnson

[57] ABSTRACT

A reciprocating floor conveyor has at least one group of at least three individually reciprocatable slat members. A drive engages each slat member and moves more than half of the slat members simultaneously in a conveying direction and moves the remainder of the slat members in the opposite direction at least at about twice the rate of speed. The drive includes a fluid pressure source, a flow divider connected to the fluid pressure source which provides a separate, equal rate of flow for each slat member, a separate extensible fluid driven cylinder for reciprocation of each slat member that is connected to a separate flow from the flow divider, and a direction valve for each fluid driven cylinder which controls fluid flow into and out of the cylinder.

6 Claims, 7 Drawing Sheets

RECIPROCATING FLOOR CONVEYOR

This application is a contination-in-part of application Ser. No. 07/874,372, filed Apr. 27, 1992, now abandoned.

BACKGROUND OF THE INVENTION

The invention pertains to reciprocating conveyors, and more specifically, to reciprocating conveyors which provide continuous movement of a load thereon.

Reciprocating conveyors providing continuous movement are generally known in the art. U.S. Pat. No. 4,580,678, issued to Foster, discloses a reciprocating floor conveyor system in which a group of six floor slat members, staggered in position relative to each other, are each first advanced and then sequentially returned such that five slats are moving forwardly while one slat moves in the return direction. The Foster reciprocating floor conveyor requires two separate sources of hydraulic pressure, one for advancing the floor slat members and another for retracting the floor slat members. This requirement for two separate hydraulic pressure sources increases the cost and complexity of the mechanism. More importantly, the reciprocating floor conveyor of Foster does not provide hydraulic flow of a constant rate, regardless of flow pressure, to each individual slat. Thus, if some slats experience a greater load than others, the slats experiencing this greater load will move a lesser distance than the slats experiencing a lesser load, or not at all, and the sequential advance of the slats will be disrupted due to this lack of substantially constant flow rate in the respective hydraulic lines.

U.S. Pat. No. 4,144,963, issued to Hallstrom, discloses a reciprocating conveyor in which at least three elongate slats are employed such that there are always a greater number of slats moving simultaneously in a conveying direction than the number of slats moving in the opposite direction. In order to achieve the above slat movement, the Hallstrom patent requires a complex fluid pressure control valve having relatively movable first and second valve members. The first valve member has a plurality of first passageways each communicating with a different extensible fluid pressure cylinder. The second valve member has a common second passageway communicating simultaneously with more than half of the first passageways, and a third passageway communicating with the remaining first passageway. One of the first valve member and the second valve member is moved relative to the other to communicate the second and third passageway selectively with different ones of the first passageways. In addition to the above unduly complex fluid pressure control valve, the Hallstrom patent is also limited by the fact that, like the above Foster patent, substantially constant flow rate, regardless of flow pressure, is not provided. Thus, as stated above, the presence of unequal loads on respective slats will cause disproportionate slat movement resulting in disruption of the slat sequence.

Conveyors for moving large loads, such as cotton bales, are also known in the art. However, these bale conveyors are not comprised of reciprocatable slats but instead have rotating chain belts which partially project through the conveyor floor. The bales are gripped by these chain belts and are urged forwardly along the conveyor. The gripping of the bales by the chain belts loosens fibers from the bales which become trapped in the conveyor mechanism. Additionally, movement of the bales on the conveyor is not substantially continuous but is sequential and of variable speed. More specifically, three of these conveyors are often aligned such that three bales can be fed into a cotton shredder or the like. While a cotton bale is located on the conveyor closest to the shredder, this conveyor feeds the bale slowly into the shredder. At this time, the bales on the other two conveyors more remotely located from the shredder also slowly advance bales thereon. When the first bale has been almost totally fed into the shredder, the two conveyors more remote from the shredder are then accelerated to transfer the bale on the middle conveyor to the conveyor closest to the shredder. Then, all three conveyors are again slowed. This type of variable speed conveyance is unduly cumbersome and results in extensive lag time for the loading of additional bales onto the conveyor system.

A need thus exists for a reciprocating floor conveyor system that is able to move a load continuously despite variation of load amounts on the respective slats thereof.

A need also exists for the above type of reciprocating floor conveyor which employs substantially constant flow rate regardless of variations in flow pressure to ensure synchronous movements of the respective slats regardless of varying loads thereon.

A need also exists for the above type of reciprocating floor conveyor which resists damage from load debris.

A need also exists for the above type of reciprocating floor conveyor which provides a substantially constant load movement to facilitate consistent loading of material thereon.

SUMMARY OF THE INVENTION

In accordance with the invention, a reciprocating floor conveyor is provided. In the first embodiment of the invention, the floor conveyor has at least one group of at least three individually reciprocated slat members. A drive engages each slat member and moves more than half of the slat members simultaneously in a conveying direction and moves the remainder of the slat members in the opposite direction at least at about twice the rate of speed. The drive includes a fluid pressure source, a flow divider connected to the fluid pressure source which provides a separate, equal rate of flow for each slat member, a separate extensible fluid driven cylinder for reciprocation of each slat member that is connected to a separate flow from the flow divider, a direction valve for each fluid driven cylinder which controls fluid flow into and out of the cylinder, and a direction valve controller. Each fluid driven cylinder has a piston-to-rod displacement of at least about 2 to 1 such that the retraction of the cylinder occurs at approximately at least twice the rate of expansion. The direction valves each have a first position in which the piston side of the fluid driven cylinder is connected to a flow from the flow divider such that the fluid driven cylinder and the engaged slat member extend, and a second position in which the rod side of the fluid driven cylinder is connected to a flow from the flow divider such that the fluid driven cylinder and the engaged slat member retract. The direction valve controller is adapted to move the direction valve from its first position to its second position when one of the slat members has fully extended, and is adapted to move the direction valve from its second position to its first position when the same slat member has fully retracted. An angled ramp is preferably located adjacent to the slat members whereby a vehicle can access the ramp to transfer a load onto the reciprocating conveyer. Preferably, the fluid driven cylinders have a piston-to-rod displacement of about 2 to 1 and the group of slats includes three slat members. However, the fluid driven cylinders can have a piston-to-rod displacement of about 3 to 1 and the group of slats can include four slat members.

In a second embodiment, the reciprocating floor conveyor has at least one group of at least three individually reciprocatable slat members. A drive engages each slat member and moves more than half of the slat members simultaneously in a conveying direction and moves the remainder of the slat members in the opposite direction. The drive includes a fluid pressure source, a flow divider connected to the fluid pressure source which provides a separate, equal rate of flow for each slat member, a separate extensible fluid driven cylinder for reciprocation of each slat member that is connected to a separate flow from the flow divider, a direction valve for each fluid driven cylinder which controls fluid flow into and out of the cylinder, and a direction valve controller. The piston side of each of the fluid driven cylinders is connected to a separate flow from the flow divider, and the rod side of each of the fluid driven cylinders is connected to the rod side of an adjacent fluid driven cylinder. Each of the direction valves has a first position in which flow enters the piston side of the fluid driven cylinder from the flow divider such that the fluid driven cylinder and the engaged slat member extend, and a second position in which flow exits the piston side of the fluid driven cylinder as flow enters the rod side of the fluid driven cylinder from an adjacent fluid driven cylinder such that the fluid driven cylinder and the engaged slat member retract. The direction valve controller is adapted to move the direction valve from its first position to its second position when one of the slat members has fully extended, and is adapted to move the direction valve from its second position to its first position when the same slat member has fully retracted. An angled ramp is oriented adjacent the group of slats such that a vehicle can access the ramp to transfer a load onto the reciprocating conveyor.

BRIEF DESCRIPTION OF THE DRAWINGS

The foregoing objects and attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
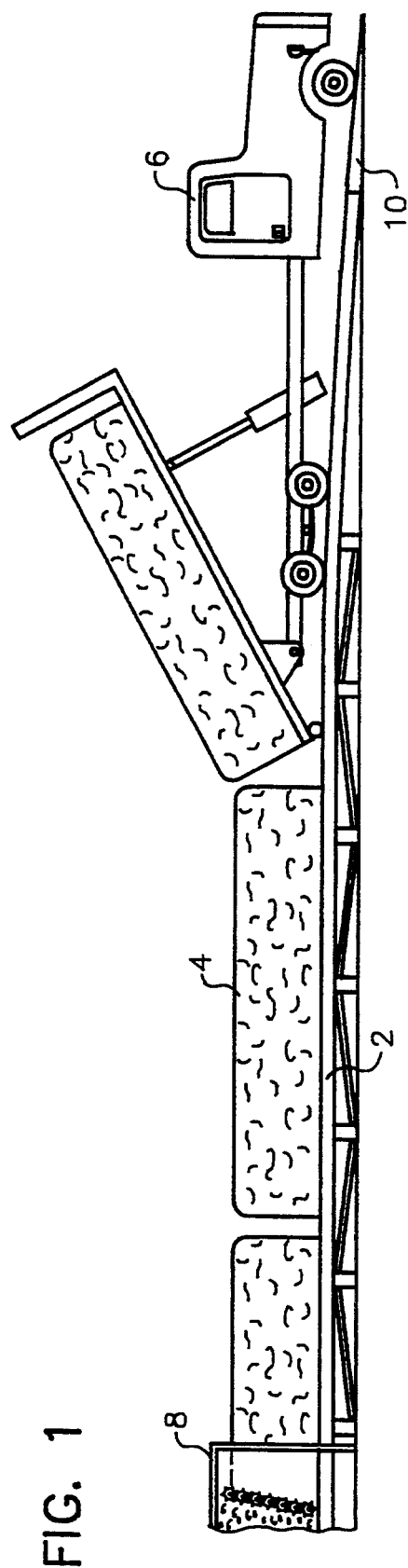
FIG. 1 is a side elevation view of the reciprocating conveyer of the present invention showing a truck unloading material thereon.

Referring first to FIG. 1, reciprocating conveyer 2 can be utilized in a variety of industrial applications such as, for example, as the load supporting bed of a truck. However, reciprocating conveyer 2 has specific utility as a feed system for large packed loads such as cotton bales 4 or the like. In this particular application, cotton bales 4 are off-loaded by truck 6 such that cotton bales 4 can then be fed into shredder 8. A unique feature of reciprocating conveyer 2 of the present invention is that truck 6 can be driven onto reciprocating conveyer 2 in order to unload cotton bales 4 by means of ramp 10 of reciprocating conveyer 2. Ramp 10 is an angled member preferably wedge shaped in cross-section which thus allows truck 6 to drive onto reciprocating conveyer 2. Additionally, reciprocating conveyer 2 preferably slopes such that reciprocating conveyer 2 is inclined with respect to shredder 8. The angle of inclination is such that the gravitional force on cotton bales 4 is less than the frictional forces of the forward moving slats.

Figure 2:
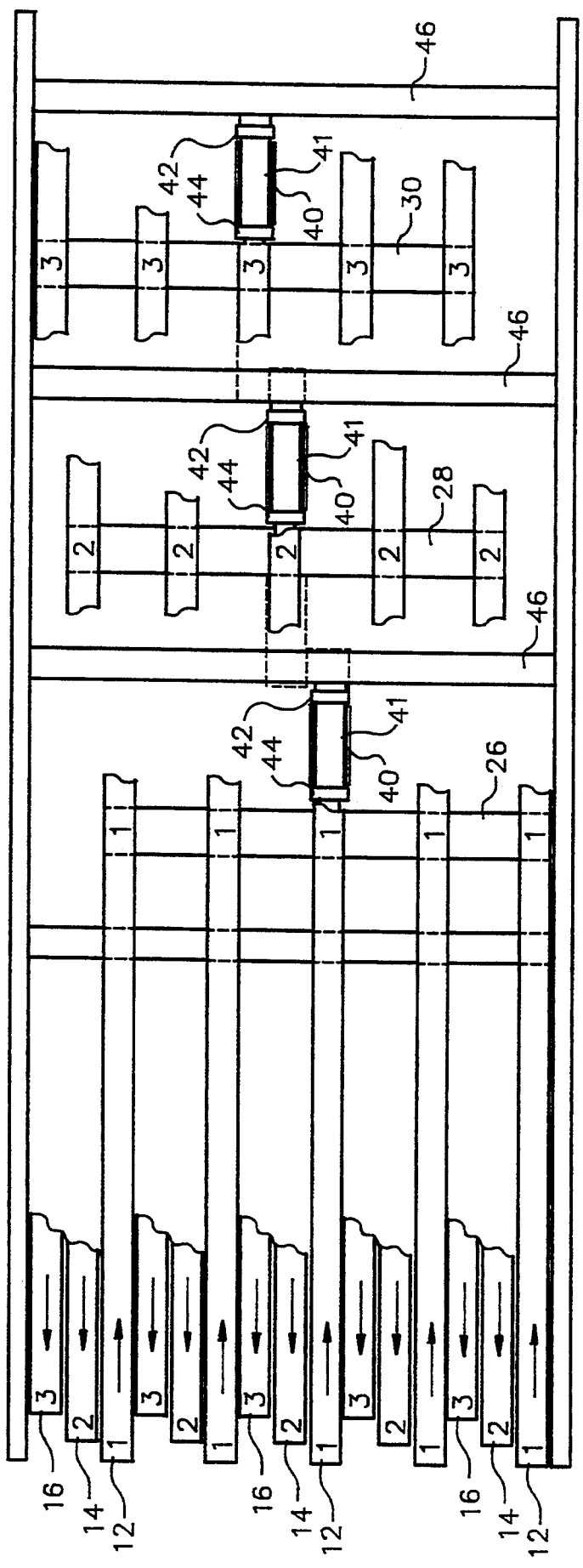
FIG. 2 is a planned view of the reciprocating conveyer of the present invention showing groups of three slats.
Figure 3:
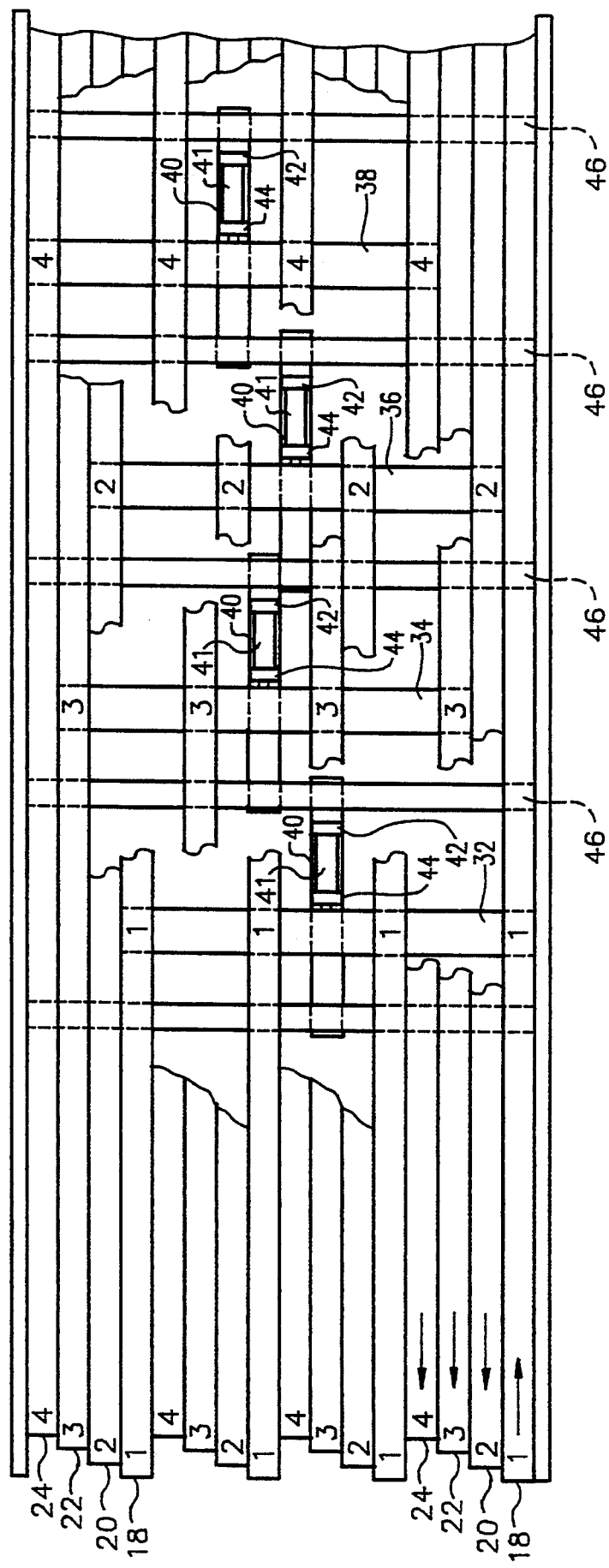
FIG. 3 as a planned view of the reciprocating conveyer of the present invention showing groups of four slats.

Referring now to FIGS. 2 through 5, reciprocating conveyer 2 comprises a plurality of groups of elongated slats extending longitudinally in the direction of conveying movement and arranged side by side. As shown in FIG. 2, each group consists of three slats 12, 14 and 16, or, as shown in FIG. 3 four slats 18, 20, 22, and 24. However, it is to be understood that each group of slats may include any desired number of slats in excess of three.

The slats of each group are configured such that each slat is capable of independent longitudinal reciprocation with respect to the other slats of that group. Thus, one slat of each separate group is interconnected for simultaneous longitudinal reciprocation. Therefore, for a reciprocating conveyer 2 in which each slat group has three slats, as shown in FIG. 2, three transverse drive beams 26, 28 and 30 are employed for slat interconnection. Where four slats per group are used in reciprocating conveyer 2, as shown in FIG. 3, four transverse drive beams 32, 34, 36 and 38 are employed.

Each of the transverse drive beams is connected to a drive cylinder 41, which is mounted on support member 40; drive cylinder 41 provides power for independent reciprocative movement of the slats of reciprocating conveyer 2. In the illustrated embodiment, drive cylinder 41 is an extensible fluid drive cylinder having a piston end 42 and a rod end 44. More specifically, piston rod 52 of cylinder 41 is secured to transverse drive beam 26, 28 and 30 or 32, 34, 36 and 38. Barrel of cylinder 41 is attached to support member 40 and to frame beams 46 which are non-moving with respect to the reciprocative slats and transverse drive beams. Thus, extension or retraction of cylinder 41 causes movement of a transverse drive beam 26 through 30 or 32 through 38 with respect to transverse frame beam 46, thus resulting in longitudinal movement of a slat 12 through 16 or 18 through 24.

Figure 5:
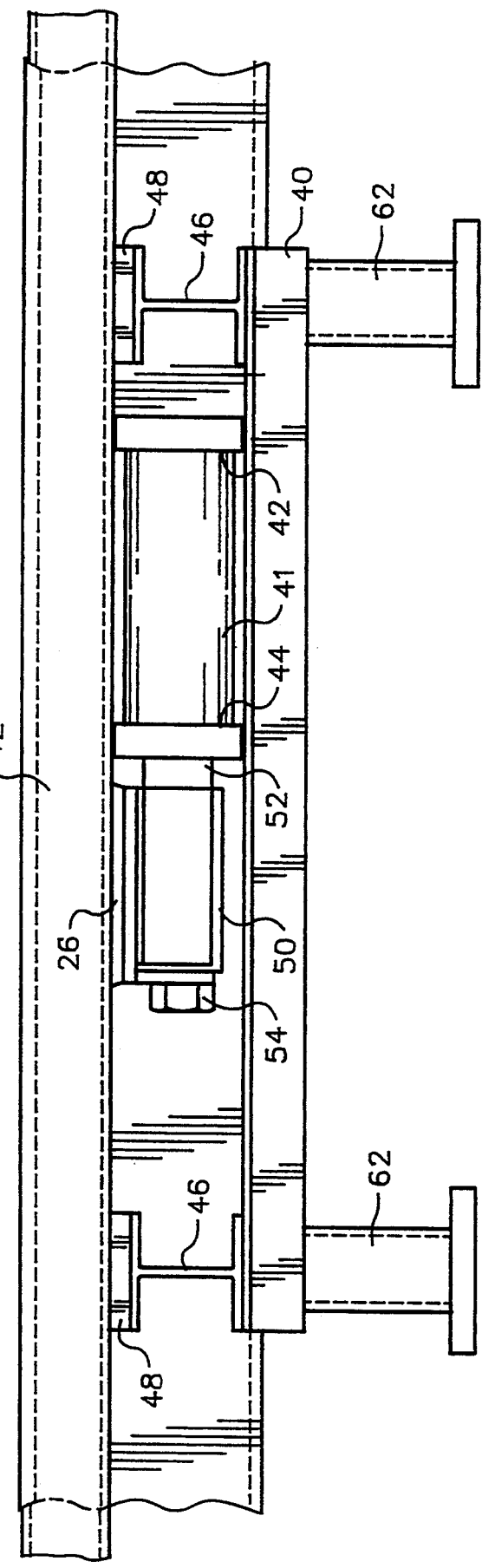
FIG. 5 as a detailed side view of the reciprocating conveyer of this present invention.

Referring specifically to FIG. 5, slats 12 through 16 or 18 through 24 are supported on transverse frame beams 46 by bearings 48, which are members known in the art that facilitate sliding reciprocation of slats. Cylinders 41 are attached to transverse drive beams 26 through 30 or 32 through 38 by cylinder bracket 50. Cylinder bracket 50 secures rod 52 of cylinder 41 therethrough by means of bolt 54. Cylinder 41 is supported under reciprocating conveyer 2 by cylinder support member 40, as stated above.

Figure 4:
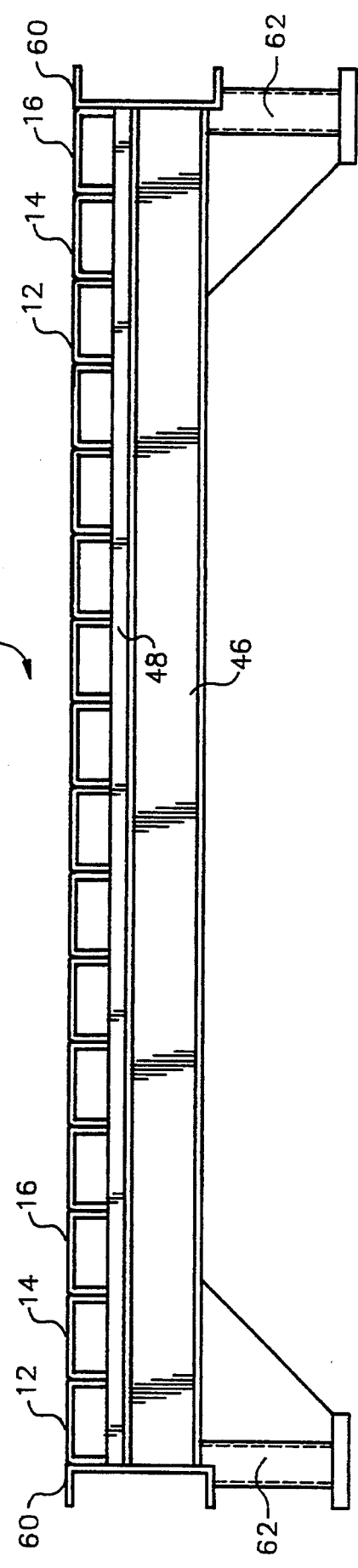
FIG. 4 is an end view of the reciprocating floor conveyer of the present invention.

Now referring to FIG. 4, slats 12 through 16 or 18 through 24 are bounded by guide beams 60 on each side of reciprocating conveyer 2. Transverse frame beams 46 are, in turn, connected to guide beams 60, and legs 62 support transverse frame beams 46 and guide beams 60 of reciprocating conveyer 2. Slats 12 through 16 or 18 through 24 are preferably comprised of structurally integral metal alloy tubing such that the slats can withstand the mass of a vehicle, such as truck 6, driven thereon to unload cotton bales 4 or the like. However, it is to be understood, that slats 12 through 16 and 18 through 24 can be comprised of other materials, such as polymers or the like, if reciprocating conveyer 2 is not intended to withstand relatively large masses.

Figure 6:
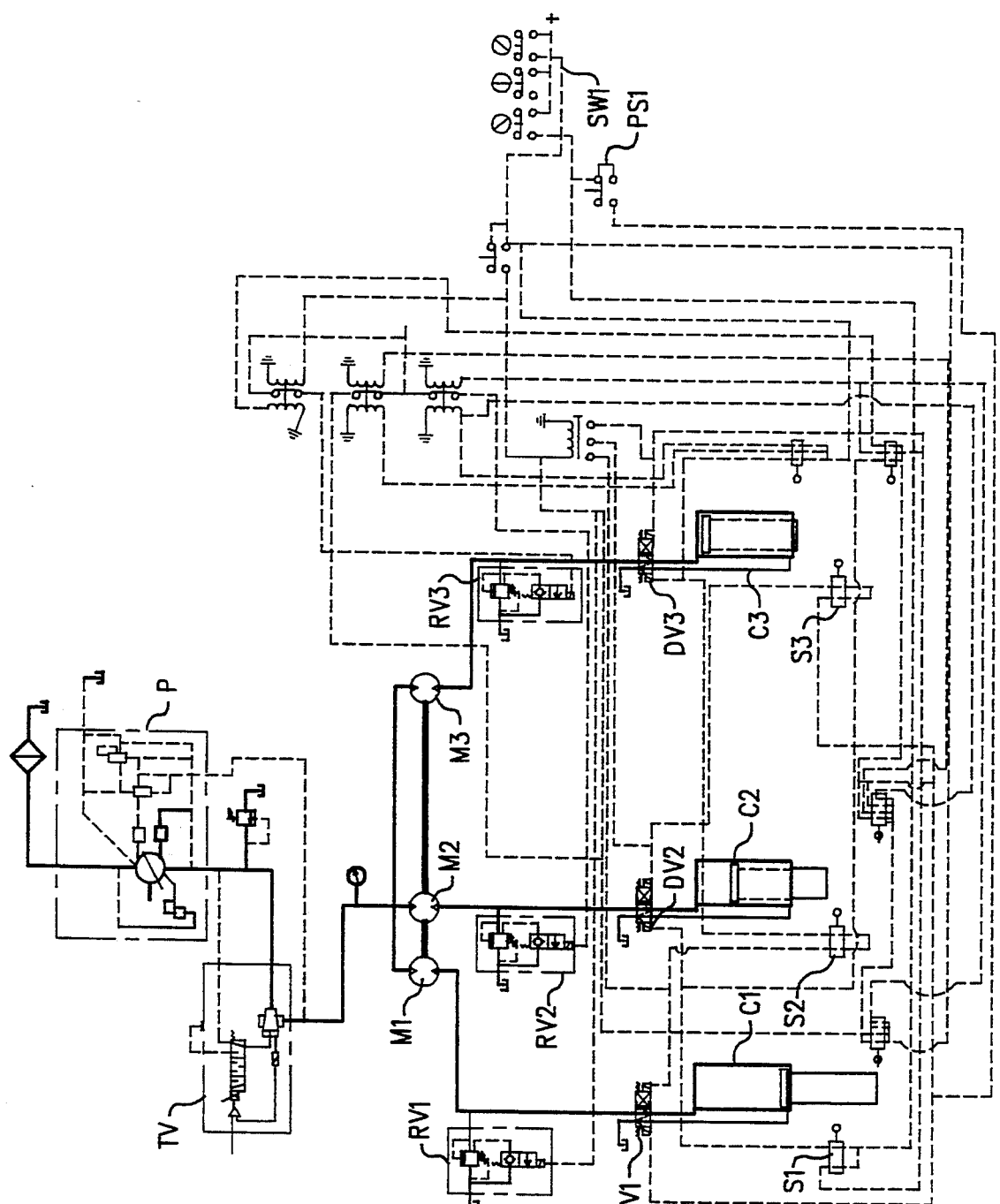
FIG. 6 is a schematic diagram of a first fluid drive system of the reciprocating conveyer of the present invention.

Referring now to FIG. 6 a first embodiment of a fluid drive system for the reciprocating conveyer of the present invention is described. Pump P, which is preferably a variable displacement pressure compensated pump designed to pump oil or other fluid, is connected to proportional throttle valve TV. Proportional throttle valve TV is in turn attached to flow divider M1, M2, M3. Flow divider M1, M2, M3 is a piston, gear or gear/rotor type flow divider known in the art which is capable of precisely dividing a given input fluid flow into a predetermined member of equal output fluid flows having the same flow rates regardless of pressure differences between the output flows. The three output flows from flow divider M1, M2, M3 are connected to relief valves RV1, RV2 and RV3, respectively. RV1, RV2 and RV3 are solenoid operated vented relief valves which are configured in the closed position with the solenoid de-energized. In the energized position relief valves RV1, RV2 and RV3 will vent back to the oil supply tank.

The three outputs from flow divider M1, M2 and M3 are also connected to two position, four way solenoid directional valves DV1, DV2 and DV3, respectively. Solenoid directional valves DV1, DV2 and DV3 communicate with cylinders C1, C2 and C3, respectively such that, in a first position, solenoid directional valves DV1, DV2 and DV3 communicate with the piston end of cylinders C1, C2 and C3 respectively; and in a second position, solenoid directional valves DV1, DV2 and DV3 communicate with the rod side of cylinders C1, C2 and C3 respectively. In this manner, solenoid directional valves DV1, DV2 and DV3 cause extension of cylinders C1, C2 and C3, and the slats attached thereto, when solenoid directional valves DV1, DV2 and DV3 are in the first position which allows oil to enter the piston side of cylinders C1, C2 and C3. When solenoid directional valves DV1, DV2 and DV3 are in the second position, they cause retraction of cylinders C1, C2 and C3, and the slats attached thereto, by causing oil to enter the rod side of cylinders C1, C2 and C3, respectively.

It is to be noted that cylinders C1, C2 and C3 are uniquely configured to have a piston-side-to-rod-side displacement ratio of 2 to 1 when three cylinders are employed. This displacement ratio ensures that the cylinders C1, C2 and C3 retract at a rate of speed of approximately twice that of the rate of extension of cylinders C1, C2 and C3. It should be noted while three cylinders C1, C2 and C3 are shown, more cylinders than three can be employed. For example, if four cylinders are employed, the piston-side-to-rod-side displacement ratio is 3 to 1.

Limit switches S1, S2 and S3 are electrically connected to solenoid directional valves DV2 and DV3. The functioning of limit switch S1 is dependent upon the relative extension of cylinder C1. Likewise, the functioning of limit switches S2 and S3 are dependent upon the relative extension of cylinders C2 and C3, respectively. More specifically, limit switches S1, S2 and S3 will be tripped when cylinders C1, C2 and C3, respectively, are extended 50% of the available stroke. Limit switches S1, S2 and S3 are connected to solenoid directional valves DV2 and DV3 such that limit switch S1 controls solenoid directional valves DV2 and DV3, limit switch S2 controls solenoid directional valves DV1 and DV3 and limit switch S3 controls solenoid directional valves DV1 and DV2.

In operation, solenoid directional valves DV1, DV2 and DV3 are all in the first position such that they communicate with the rod side of cylinders C1, C2 and C3, respectively. Cylinders C1, C2 and C3 have retracted and any oil therefrom passes to the oil supply tank from relief valves RV1, RV2 and RV3, respectively. Next, switch SW1 is moved to the forward position and switch PS1 is momentarily pressed. This positions solenoid directional valve DV1 to the first position in which solenoid directional valve DV1 communicates with the piston side of cylinder C1 to extend cylinder C1. After traveling one-half of its available stroke, cylinder C1 will actuate limit switch S1, which in turn operates solenoid directional valves DV2 and DV3. Thus, solenoid directional valve DV2 is now configured in its first position in which it communicates with the piston side of cylinder C2 to extend cylinder C2 at the same speed as the extension of cylinder C1 due to the equal oil flows in the flow outputs provided by flow divided M1, M2, M3, regardless of pressure differences. While limit switch S1 controls solenoid directional valve DV3 as well, solenoid directional valve DV3 is already configured in its second position in which solenoid directional valve DV3 communicates with the rod side of cylinder C3; cylinder C3 thus remaining stationery.

After traveling one-half of its available stroke, cylinder C2 operates limit switch S2 which in turn controls solenoid directional valve DV1 and DV3. Solenoid directional valve DV3 is thus reconfigured to its first position in which it communicates with the piston side of cylinder C3 to extend cylinder C3 at the same rate of extension as cylinder C2. As stated above, limit switch S2 operates solenoid directional valve DV1, thus causing solenoid directional valve DV1 to, at this time, be reconfigured to its second position in which solenoid directional valve DV1 communicates with the rod side of cylinder C1 to cause retraction of cylinder C1 at the end of its stroke; the initiation of this retraction coinciding with the initiation of extension of cylinder C3. It is important to note that due to the above mentioned 2 to 1 piston-side-to-rod-side displacement ratio of cylinders C1, C2 and C3 cylinder C1 retracts at a rate that is twice the rate of extension of cylinders C2 and C3.

After traveling one-half of its available stroke cylinder C3 will operate limit switch S3 which in turn controls solenoid directional valves DV1 and DV2. Solenoid directional valve DV1 will be reconfigured to its first position in which it communicates with the piston side of cylinder C1 such that cylinder C1 extends. It should be noted that this extension occurs after cylinder C1 had been fully retracted. Additionally, solenoid directional valve DV2 is reoriented to communicate with the rod side of cylinder C2, which at this point has had fully extended, to now retract cylinder C2. Cylinder C2 will retract at twice the rate as it extended due to the above mentioned 2 to 1 piston-side-to-rod-side displacement ratio.

After traveling one-half of its available stroke, cylinder C1 will operate limit switch S1 and, as described above, cylinder C2 will extend and cylinder C3 will retract due to actuation of solenoid directional valves DV2 and DV3 by limit switch S1. The above described cyclical extension and retraction of cylinders C1, C2 and C3 and their attached slats continues until the system is de-energized. It is thus readily apparent that due to the equal oil flow rates received by cylinders C1, C2 and C3 from flow divider M1, M2, M3, regardless of pressure fluctuations; and also due to the piston side to rod side displacement of 2 to 1 of cylinders C1, C2 and C3, two thirds of the slats will always be extending in the conveying direction while one third of the slats will be retracting in the opposite direction at twice the conveying speed. The difference in frictional forces associated with two thirds of the slats moving in the conveying direction versus one third of the slats retracting will move a load in the conveying direction.

Figure 7:
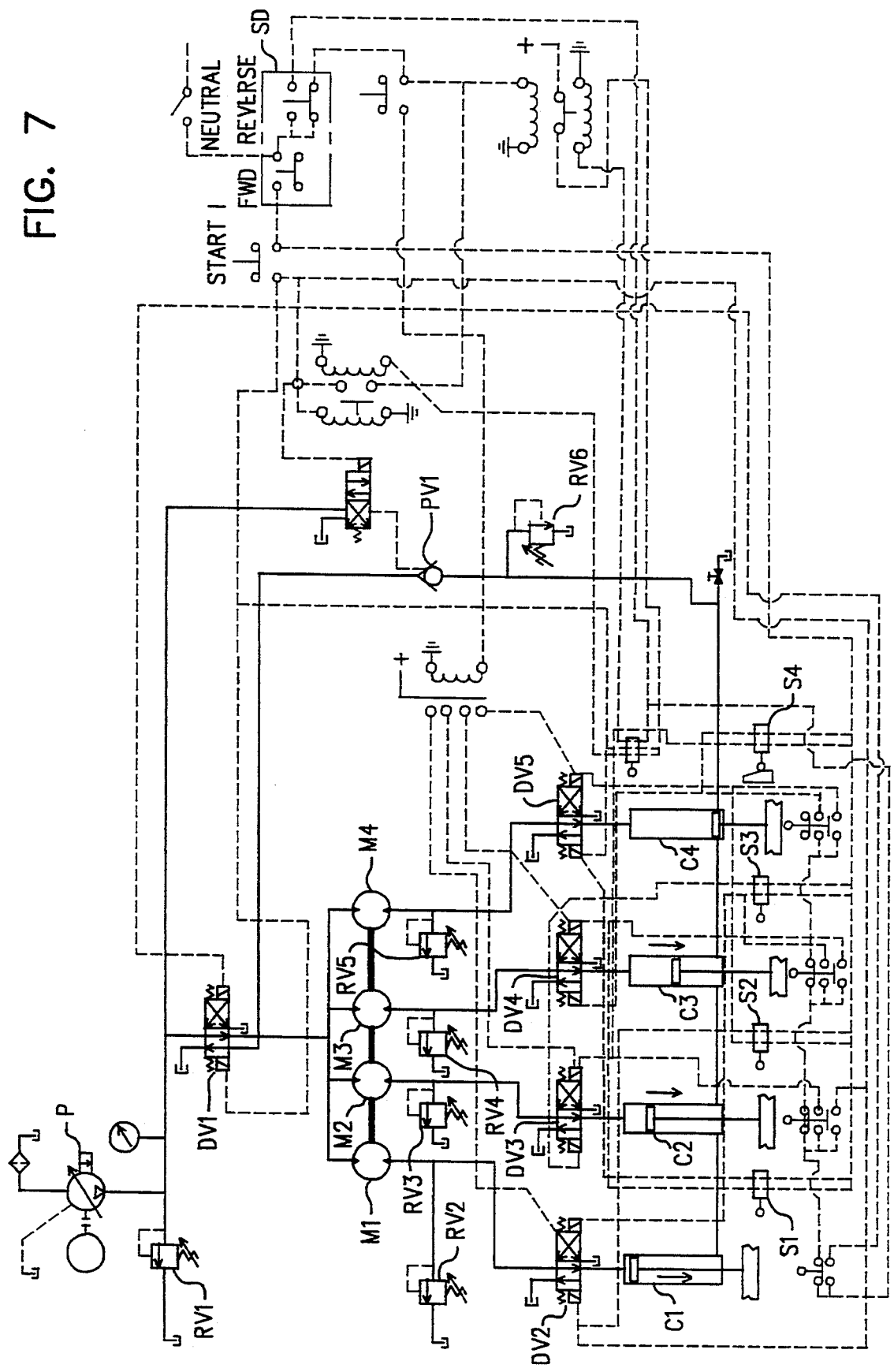
FIG. 7 is a schematic diagram of a second fluid drive system of the reciprocating conveyer of the present invention.

Now referring to FIG. 7, a second embodiment of the fluid drive system employed with the reciprocating conveyer of the present invention is shown. In this second embodiment of the fluid drive system, elements denoted therein by the same designation as elements denoted in the first embodiment of the fluid drive system of FIG. 6 denote like elements with like functioning. Pump P communicates with relief valve RV1 and solenoid directional valve DV1. Solenoid directional valve DV1 is a two position, four way directional valve which, in one position, communicates with flow divider M1, M2, M3, M4. Flow divider M1, M2, M3, M4 is a precision flow divider which divides flow into, in this case, four flow outputs having equal flow rates regardless of pressure differences between the flow outputs. Relief valves RV2, RV3, RV4 and RV5 communicate with the four respective flow outputs of flow divider M1, M2, M3, M4. The four respective flow outputs of flow divider M1, M2, M3, M4 are connected to solenoid directional valves DV2, DV3, DV4 and DV5, respectively. Solenoid directional valves DV2, DV3, DV4 and DV5 are, in turn, connected to cylinders C1, C2, C3 and C4 respectively. Unlike the above described first embodiment of the fluid drive system, cylinders C1, C2, C3 and C4 of the second embodiment need not have a piston-side-to-rod-side displacement ratio of about 2 to 1. While four cylinders C1, C2, C3 and C4 are shown in the second embodiment, it is understood that three cylinders, or more than four cylinders, can also be employed. Solenoid directional valves DV2, DV3, DV4 and DV5 communicate with cylinders C1, C2, C3 and C4 such that when solenoid directional valves DV1, DV2, DV3 and DV4 are configured in a first position, they communicate with the piston side of cylinders C1, C2, C3 and C4, respectively. When solenoid directional valves DV2, DV3, DV4 and DV5 are configured in a second position, they again communicate with the piston side of cylinders C1, C2, C3 and C4. In this second configuration the connection between solenoid directional valves DV2, DV3, DV4 and DV5 and cylinders C1, C2, C3 and C4, respectively, is such that oil can be released from the piston side of cylinder C1, C2, C3 and C4 to the oil supply tank. Additionally, in this second configuration of solenoid directional valves DV2, DV3, DV4 and DV5 oil from flow divider M1, M2, M3, M4 is also vented to the oil supply tank.

The rod sides of cylinders C1, C2, C3 and C4 are interconnected such that cylinder C1 is connected to C2, cylinder C2 is connected to C3, cylinder C3 is connected to C4, and cylinder C4 is connected to relief valve RV 6.

Limit switches S1, S2, S3 and S4 control solenoid directional valves DV2, DV3, DV4 and DV5. Limit switches S1, S2, S3 and S4 are configured to activate solenoid directional valves DV2, DV3, DV4 and DV5 after cylinder C1, C2, C3 and C4, respectively, have extended one third of the available stroke. More specifically, limit switch S1 controls solenoid directional valves DV4 and DV5, limit switch S2 controls directional control valves DV2 and DV5, limit switch S3 controls solenoid directional valves DV2 and DV3, and limit switch S4 controls solenoid directional valves DV3 and DV4.

In operation, cylinders C1, C2, C3 and C4 are configured in their retracted positions and the rod sides of cylinders C1, C2, C3, and C4 are filled with oil. Solenoid directional valves DV2, DV3, DV4 and DV5 are configured in their second positions where the piston side of cylinders C1, C2, C3 and C4 are vented to the oil supply tank. Switch SD is moved to forward and switch START I is activated. Solenoid directional valve DV2 is thus energized and is reconfigured to its first position such that oil passes into the piston side of cylinder C1 causing cylinder C1 to extend.

After cylinder C1 travels one third of its stroke, switch S1 is activated, which in turn reconfigures solenoid directional valves DV4 and DV5. Since solenoid directional valve DV4 is already configured in its second position it will not be activated. Solenoid directional valve DV5 will be reconfigured to its first position by switch S1 such that oil enters the piston side of cylinder C4 causing C4 to extend.

After cylinder C4 extends one third of its available stroke, limit switch S4 will be activated. Limit switch S4 will control solenoid directional valves DV3 and DV4. Since solenoid directional valve DV3 is already in its second position, it will not be activated. Switch S1 will reconfigure solenoid directional valve DV4 to its first position, causing oil to enter the piston side of cylinder C3 which results in extension of cylinder C3.

After cylinder C3 extends one third of its available stroke, limit switch S3 will be activated. It should be noted that up to this point, oil displaced by the extension of cylinders C1, C3 and C4 has been vented to the oil supply tank through relief valve RV6. However, activation of switch S3 by extension of cylinder C3 reconfigures solenoid directional valve DV2 to its second position in which oil in now fully extended cylinder C1 is vented to the oil supply tank through solenoid directional valve DV2 instead of relief valve RV6. Additionally, activation of switch S3 by extension of cylinder C3 reconfigures solenoid directional valve DV3 to its first position such that oil flows into the piston side of cylinder C2 to cause cylinder C2 to extend. Thus, the extension of cylinders C2, C3 and C4 by one third of their respective available strokes causes cylinder C1 to move from its fully extended position to its fully retracted position as the oil displaced by the extension of cylinders C2, C3 and C4 passes from the interconnected rod side of cylinders C2, C3 and C4 into the rod side of cylinder C1, such that the oil in the piston side of the cylinder C1 is exhausted through solenoid directional valve DV2 instead of via relief valve RV6.

Next, when cylinder C2 has extended one third of its available stroke, it will activate limit switch S1 which controls solenoid directional valves DV2 and DV5. Solenoid directional valve DV2 will be reconfigured to its first position such that oil will flow into the piston side of cylinder C1, causing cylinder C1 to extend. Limit switch S1 will reconfigure solenoid directional valve DV5 to its second position which allows oil within fully extended cylinder C4 to be exhausted therefrom through solenoid directional valve DV5 and to the oil supply tank. Thus, the extension of cylinders C1, C2 and C3 by one third of their respective available strokes will cause cylinder C4 to move from its fully extended position to its fully retracted position as the oil displaced from the extension of cylinders C1, C2 and C3 passes through the interconnected rod sides of cylinder C1, C2 and C3 into the rod side of cylinder C4 such that the oil in the piston side of cylinder C4 is exhausted through solenoid directional valve DV5.

The above cyclical extension and retraction of cylinders C1, C2, C3 and C4, and the slats connected thereto, will continue until the system is de-energized. It should be noted that the direction of conveyance is reversible by employing pilot operated check valve PV1 and incorporating additional limit switches known in the art.

Figure 8:
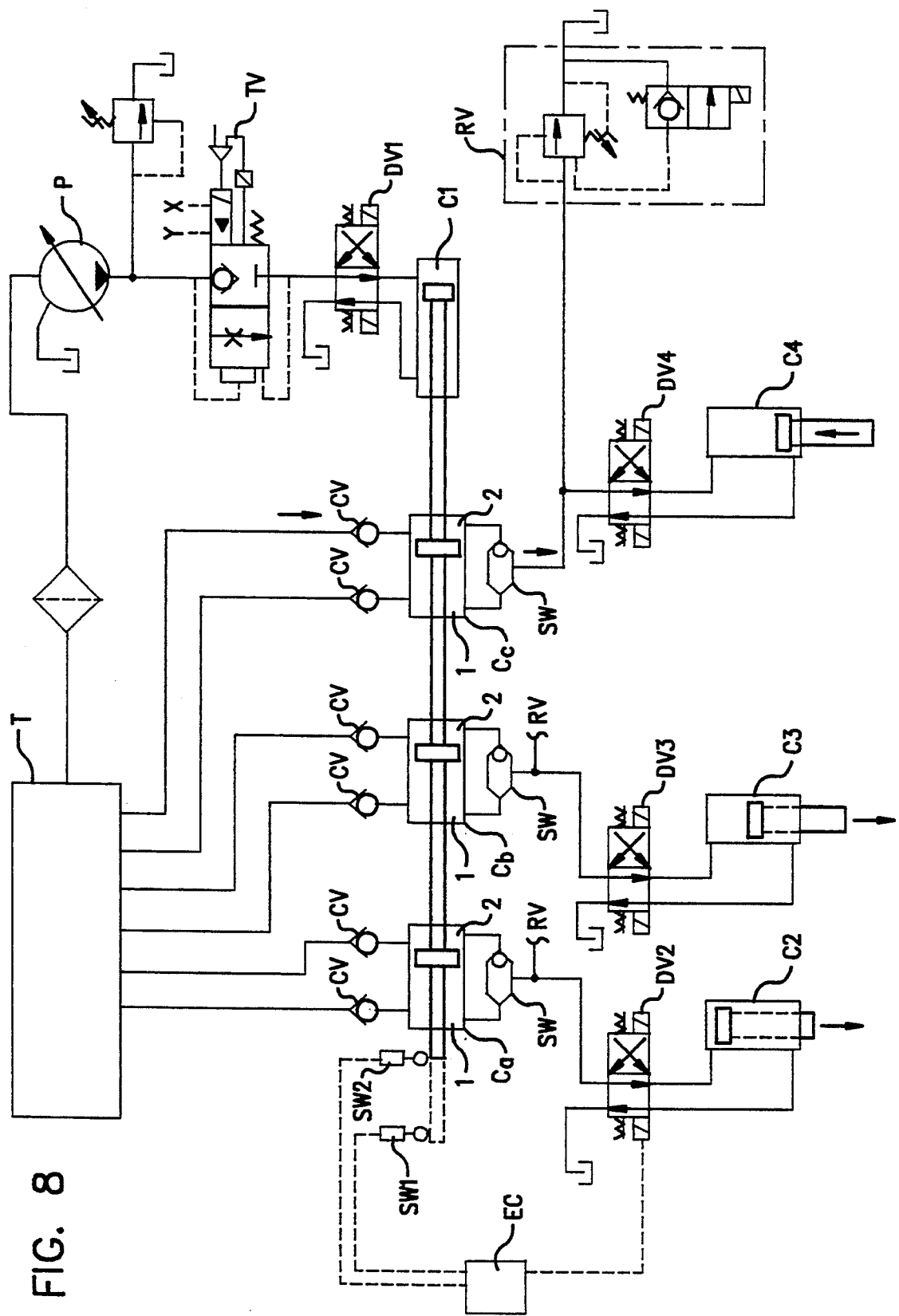
FIG. 8 is a schematic diagram of a fluid drive system of the reciprocating conveyor of the present invention employing a unique flow divider configuration.

Referring now to FIG. 8, a flow divider configuration is now described which can be used with either the first fluid drive system of FIG. 6 or the second fluid drive system of FIG. 7. For the purposes of description, FIG. 8 employs the three slat system of FIG. 6 in which three fluid driven cylinders, each having a 2:1 piston-side-to-rod-side displacement ratio, are employed.

As shown in FIG. 8, pump P, which is preferably a variable displacement pressure compensated pump designed to pump oil or other fluid, is connected to proportional throttle valve TV. Pump P also communicates with tank, or reservoir, T. Proportional throttle valve TV is, in turn, attached to solenoid directional valve DV1. Solenoid directional valve DV1 communicates with primary flow divider cylinder C1 such that, in a first position, solenoid directional valve DV1 communicates with the piston end of primary flow divider cylinder C1, and in a second position, solenoid directional valve DV1 communicates with the rod side of primary flow divider cylinder C1. In this manner, solenoid directional valve DV1 causes extension of primary flow divider cylinder C1 when solenoid directional valve D1 is in the first position which allows oil to enter the piston side of primary flow divider cylinder C1. When solenoid directional valve DV1 is in the second position, it causes retraction of cylinder C1 by causing oil to enter the rod side of primary flow divider cylinder C1.

The rod of primary flow divider cylinder C1 passes longitudinally through a plurality of secondary flow divider cylinders Ca, Cb, and Cc. On the rod of primary flow divider cylinder C1, in each of secondary flow divider cylinders Ca, Cb, and Cc, is a piston which divides each of secondary flow divider cylinders Ca, Cb, and Cc into a chamber 1 and a chamber 2. The relative volumes of chambers 1 and chambers 2 are altered by the piston of the secondary flow divider cylinders Ca, Cb, and Cc and are reciprocated by the rod of the primary flow divider cylinder C1. Each of secondary flow divider cylinders Ca, Cb, and Cc has a pair of fluid inlets, one fluid inlet communicating with chamber 1 and the other fluid inlet communicating with chamber 2 of each of the secondary flow divider cylinders Ca, Cb, and Cc. A check valve CV is located on each line that communicates tank T with chamber 1 or chamber 2 of secondary flow divider cylinder Ca, Cb, or Cc. Each secondary flow divider cylinder Ca, Cb, and Cc has a pair of fluid outlets, one of these fluid outlets Located in chamber 1, and the other of the fluid outlets located in chamber 2 of each secondary flow divider cylinder Ca, Cb, and Cc. The two fluid outlets of each secondary flow divider cylinder Ca, Cb, and Cc are interconnected by a switch valve SV which provides alternate fluid flow from either one or the other of the two fluid outlets of each of secondary flow divider cylinders Ca, Cb, and Cc.

Each of the three fluid outlet lines connected to one of secondary flow divider cylinder Ca, Cb, or Cc by a switch valve SV also communicates with a relief valve RV. Relief valve RV is a solenoid operated vented relief valve which is configured in the closed position with the solenoid de-energized. In the energized position, relief valve RV will vent back to the tank T. Additionally, each of the three fluid outlet lines connected to one of secondary flow divider cylinder Ca, Cb, or Cc also communicates with two-position, four-way solenoid directional valves DV2, DV3, and DV4, respectively. Solenoid directional valves DV2, DV3, and DV4 communicate with cylinders C2, C3, and C4, respectively, such that, in a first position, solenoid directional valves DV2, DV3, and DV4 communicate with the piston side of cylinders C2, C3, and C4, respectively; and in a second position, solenoid directional valves DV2, DV3, and DV4 communicate with the rod side of cylinders C2, C3, and C4, respectively. In this manner, solenoid directional valves DV2, DV3, and DV4 cause extension of cylinders C2, C3, and C4, and the slats attached thereto, when solenoid directional valves DV2, DV3, and DV4 are in the first position which allows oil to enter the piston side of cylinders C2, C3, and C4. When solenoid directional valves DV2, DV3, and DV4 are in the second position, they cause retraction of cylinders C2, C3, and C4, and the slats attached thereto, by causing oil to enter the rod side of cylinders C2, C3, and C4, respectively.

Electrical switches SW1 and SW2, along with electrical controller EC, which is a control device well known in the art, control the extension and retraction of primary flow divider cylinder C1, as well as the positioning of solenoid directional valves DV2, DV3, and DV4 in either the first or second position such that fluid flow is provided to cylinders C2, C3, and C4 from secondary flow divider cylinders Ca, Cb, and Cc, respectively, so that the desired slat reciprocation is accomplished as described in further detail below.

In operation, primary flow divider cylinder C1 is initially retracted such that chambers 1 of secondary flow divider cylinders Ca, Cb, and Cc have a greater volume than chambers 2 thereof. Switch valves SV are all configured such that the fluid outlets communicating with chambers 1 of secondary flow divider cylinders Ca, Cb, and Cc are open and the fluid outlets communicating with chambers 2 thereof are closed. Fluid from pump P passes through solenoid directional valve DV1 and into the piston side of primary flow divider cylinder C1 such that the rod of primary flow divider cylinder C1 extends. This extension of the rod of primary flow divider cylinder C1 causes the pistons located in each of secondary flow divider cylinders Ca, Cb, and Cc to force fluid out of chambers 1 thereof and into cylinders C2, C3, and C4, respectively. More specifically, because, as shown in FIG. 8, cylinder C2 is totally retracted, cylinder C3 is 50% retracted, and cylinder C4 is totally extended, fluid passes through solenoid directional valve DV2 and into the piston side of cylinder C2 to extend cylinder C2 by 50%, fluid passes through solenoid directional valve DV3 and into the piston side of cylinder C3 to extend cylinder C3 100%, and fluid flows through solenoid directional valve DV4 and into the rod side of cylinder C4 to retract cylinder C4 100%.

After full extension of primary flow divider cylinder C1, chambers 2 of each of secondary flow divider cylinders Ca, Cb, and Cc are filled with fluid from tank T through the respective fluid inlets of secondary flow divider cylinders Ca, Cb, and Cc communicating with chambers 2 thereof. Switch valves SV are configured such that the fluid outlet communicating with chambers C1 of secondary flow divider cylinders Ca, Cb, and Cc are closed, and the fluid outlets communicating with chambers 2 thereof are open. Next, fluid enters the rod side of primary flow divider cylinder C1 from solenoid directional valve DV1 such that primary flow divider cylinder C1 retracts, thus causing the pistons in secondary flow divider cylinders Ca, Cb, and Cc to force fluid out of chamber C2 of secondary divider cylinders Ca, Cb, and Cc and into cylinders C2, C3, and C4, respectively. More specifically, fluid enters the rod side of cylinder C2 from solenoid directional valve DV2 thus causing cylinder C2 to extend by another 50% to its fully extended position, fluid enters the rod side of cylinder C3 from solenoid directional valve DV3 causing the fully extended cylinder C3 to fully retract, and fluid enters the piston side of cylinder C4 from solenoid directional valve DV4 causing the fully retracted cylinder C4 to extend by 50%.

Next, chambers 1 of secondary flow dividers cylinders Ca, Cb, and Cc are filled with fluid from tank T by the fluid inlets connected thereto. Switch valves SV are configured such that the fluid outlets communicating with chambers 1 of secondary flow divider cylinders Ca, Cb, and Cc are open and the fluid outlets communicating with chambers 2 thereof are closed. Primary flow divider cylinder C1 is again extended by fluid entering the piston side of primary fluid divider cylinder Ca through solenoid directional valve DV1 such that fluid enters cylinders C2, C3, and C4. More specifically, fluid from solenoid directional valve DV2 enters the rod side of fully extended cylinder C2 to fully retract cylinder C2, fluid enters the piston side of fully retracted cylinder C3 to extend cylinder C3 by 50%, and fluid from solenoid directional valve DV4 enters the piston side of C4 to fully extend the 50% extended cylinder C4.

Finally, primary flow divider cylinder C1 is again retracted as described above to reconfigure cylinders C2, C3, and C4 in the original configuration shown in FIG. 8.

While preferred embodiments of the invention have been illustrated and described, it will be appreciated that various changes can be made therein without departing from the spirit and scope of the invention.

I claim:

1. A reciprocating conveyor comprising:
   at least one group of at least three slat members, each of said slat members being individually reciprocatable; and
   drive means engaging each slat member and operable to move more than half of said slat members simultaneously in a conveying direction and to move a remainder of said slat members in an opposite direction at least at about twice a rate of speed, said drive means comprising:
   a fluid pressure source providing a plurality of fluid flows having substantially equal and constant flow rates;
   an extensible fluid driven cylinder for reciprocation of each slat member of a group connected to one of said plurality of fluid flows having substantially equal and constant flow rate from said fluid pressure source, each of said fluid driven cylinders being divided into a piston side and a rod side and having a piston side to rod side displacement of at least about 2 to 1, such that said retraction of said fluid driven cylinder occurs at least at approximately twice the rate as expansion of said fluid driven cylinder, said piston side of said fluid driven cylinders not being directly interconnected;
   a direction valve means for each fluid driven cylinder, each of said direction valve means having a first position in which said piston side of said fluid driven cylinder is connected to one of said plurality of fluid flows having substantially equal and constant flow rates from said fluid pressure source such that said fluid driven cylinder and said engaged slat member extend, and a second position in which said rod side of said fluid driven cylinder is connected to one of said plurality of fluid flows having substantially equal and constant flow rates from said fluid pressure source such that said fluid driven cylinder and said engaged slat member retract; and
   means for controlling said direction valve means such that said direction valve means is moved from its first position to its second position when one of said slat members has fully extended, and said direction valve means is moved from its second position to its first position when said one of said slat members has fully retracted.

2. The reciprocating conveyor of claim 1 wherein said group of slats has three slat members.

3. The reciprocating conveyor of claim 1 wherein said fluid driven cylinders have a piston side to rod side displacement of about 3 to 1 and said group of slats has four slat members.

4. The reciprocating conveyor of claim 1 wherein said fluid pressure source includes a plurality of relief valve means communicating with a plurality of outlets of a flow divider means.

5. The reciprocating conveyor of claim 1 further comprising:
   an angled ramp adjacent said group of slats whereby a vehicle can access said ramp to transfer a load onto said reciprocating conveyor.

6. The reciprocating conveyor of claim 1 having a flow divider means wherein said flow divider means comprises:
   primary flow divider cylinder means communicating with said fluid pressure source, said primary flow divider cylinder means including a rod and a piston;

a secondary flow divider cylinder means for each of said fluid driven cylinders, each of said secondary flow divider cylinder means attached to said rod of said primary flow divider cylinder means and having a piston dividing said secondary flow divider cylinder means into a first chamber having an internal volume and a second chamber having an internal volume, each of said first chamber and said second chamber having an inlet and an outlet, each of said inlets communicating with a fluid reservoir whereby reciprocation of said rod of said primary flow divider cylinder varies said internal volume of said first chamber and said internal volume of said second chamber of said secondary flow divider cylinder means;

switch means interconnecting said first chamber outlet and said second outlet chamber of each of said secondary flow divider cylinder means, each of said switch means providing alternate fluid flow from said first chamber outlet and said second chamber outlet, each of said switch means communicating with one of said direction valve means for said fluid driven cylinders whereby fluid alternately passes from said first chamber and into said first chamber outlet and from said second chamber and into said second chamber outlet as the relative volumes of said first chamber and said second chamber are respectively decreased by reciprocation of said rod of said primary flow divider cylinder; and means for controlling reciprocation of said primary flow divider cylinder means in concert with control of said direction valve means of said fluid driven cylinders.

* * * * *